(12) United States Patent
Stack et al.

(10) Patent No.: US 11,424,581 B2
(45) Date of Patent: Aug. 23, 2022

(54) ELECTRIC VEHICLE CHARGE PORT ILLUMINATION MODULE

(71) Applicant: GM GLOBAL TECHNOLOGY OPERATIONS LLC, Detroit, MI (US)

(72) Inventors: Matthew M. Stack, Macomb Township, MI (US); Omair Mustafa, Windsor (CA); Dayananda Narasimhaiah, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 376 days.

(21) Appl. No.: 16/819,824

(22) Filed: Mar. 16, 2020

(65) Prior Publication Data
US 2021/0288455 A1    Sep. 16, 2021

(51) Int. Cl.
| | |
|---|---|
| *H01R 13/717* | (2006.01) |
| *H01R 13/74* | (2006.01) |
| *H02J 7/00* | (2006.01) |
| *B60L 53/16* | (2019.01) |
| *B60Q 1/26* | (2006.01) |
| *B60K 1/00* | (2006.01) |
| *F21V 8/00* | (2006.01) |

(52) U.S. Cl.
CPC .......... *H01R 13/7175* (2013.01); *B60K 1/00* (2013.01); *B60L 53/16* (2019.02); *B60Q 1/2661* (2013.01); *H01R 13/74* (2013.01); *H02J 7/0045* (2013.01); *B60Q 1/26* (2013.01); *G02B 6/0005* (2013.01); *H01R 2201/26* (2013.01)

(58) Field of Classification Search
CPC ............................ H01R 13/7175; B60L 53/16
USPC ......................................................... 439/490
See application file for complete search history.

(56) References Cited

U.S. PATENT DOCUMENTS

| | | | | |
|---|---|---|---|---|
| 2,518,812 | A * | 8/1950 | Oswald ................. | H01R 13/68 337/182 |
| 5,790,041 | A * | 8/1998 | Lee ....................... | H01R 13/713 340/815.45 |
| 5,876,239 | A * | 3/1999 | Morin .................. | H01R 13/717 439/490 |
| 5,924,889 | A * | 7/1999 | Wang .................... | H01R 24/50 439/490 |
| 8,134,334 | B2 * | 3/2012 | Suzuki ................. | B60Q 1/2661 362/459 |
| 8,226,284 | B2 * | 7/2012 | Markyvech ........... | B60L 3/04 362/540 |

(Continued)

*Primary Examiner* — Neil Abrams
(74) *Attorney, Agent, or Firm* — Quinn IP Law

(57) ABSTRACT

A charge port module for an electric vehicle (EV) includes a charge port body having a first side, a second side, and an interface for mounting to an EV body. The module also includes a receptacle on the charge port body first side and configured to accept a charging plug. The module additionally includes an electrical connector on the charge port body second side, in electrical communication with the receptacle, and configured to engage an EV electrical system. The first side of the charge port body defines a channel. The module also includes a cartridge configured to slidingly engage the channel. The cartridge includes a cartridge body defining an access opening configured to facilitate charging plug access to the receptacle after the cartridge has engaged and has seated in the channel. A light element is arranged on the cartridge body and configured to illuminate the receptacle.

20 Claims, 6 Drawing Sheets

(56) References Cited

U.S. PATENT DOCUMENTS

| | | | | |
|---|---|---|---|---|
| 9,150,172 B2* | 10/2015 | Matsuda | ............... | B60L 53/305 |
| 9,197,072 B2* | 11/2015 | Umeda | ................... | B60L 53/18 |
| 9,457,673 B2* | 10/2016 | Masuda | ................. | B60L 53/24 |
| 10,406,970 B2* | 9/2019 | Hook | ...................... | B60L 53/16 |
| 10,501,007 B2* | 12/2019 | Salter | ...................... | F21S 43/16 |
| 10,717,383 B2* | 7/2020 | Ueno | ....................... | B60Q 1/50 |
| 10,878,644 B2* | 12/2020 | Fukuda | .................. | B60L 53/16 |
| 11,072,252 B2* | 7/2021 | Winkler | ................. | B60K 35/00 |
| 2019/0106006 A1* | 4/2019 | Ng | ..................... | H01R 13/6205 |
| 2021/0288455 A1* | 9/2021 | Stack | ....................... | B60Q 1/50 |
| 2021/0291673 A1* | 9/2021 | Carpenter | .......... | H01R 13/5213 |

* cited by examiner

US 11,424,581 B2

ELECTRIC VEHICLE CHARGE PORT ILLUMINATION MODULE

INTRODUCTION

The present disclosure relates to an illumination module for a charge port of an electric vehicle.

An electric vehicle, also called an EV, uses one or more electric or traction motors for propulsion. An electric vehicle may be powered through a collector system by, electricity from off-vehicle sources, or may be self-contained with a battery, solar panels, or an electric generator to convert fuel to electricity.

A plug-in electric vehicle (PEV) is a motor vehicle that includes a rechargeable battery pack that may be recharged from an external source of electricity, such as a wall socket, while the electricity stored in the rechargeable battery pack drives or contributes to driving the wheels. PEV is a subcategory of electric vehicles that includes all-electric or battery electric vehicles (BEVs), plug-in hybrid vehicles (PHEVs), and electric vehicle conversions of hybrid electric vehicles and conventional internal combustion engine vehicles. A hybrid electric vehicle (HEV) combines a conventional (usually fossil fuel-powered) powertrain with some form of electric propulsion.

EVs typically charge from conventional power outlets or dedicated charging stations, a process that typically takes a considerable amount of time but may be done overnight and often gives a charge that is sufficient for normal everyday usage. EV users may plug in their cars while at work and leave them to charge throughout the day, extending the possible range of commutes and eliminating range anxiety.

SUMMARY

A charge port module for an electric vehicle (EV) includes a charge port body having a first side, an opposite second side, and an interface for mounting to a body of the EV. The charge port module also has a receptacle fixed to the first side of the charge port body and configured to accept a charging plug. The charge port module additionally has an electrical connector fixed to the second side of the charge port body, in electrical communication with the receptacle, and configured to engage an electrical system including a battery of the EV. The charge port module additionally has a channel defined by the first side of the charge port body. The charge port module also includes a cartridge configured to slidingly engage the channel. The cartridge includes a cartridge body defining an access opening configured to facilitate access of the charging plug to the receptacle after the cartridge has engaged and has seated in the channel. The cartridge also includes a light element arranged on the cartridge body and configured to illuminate the receptacle.

The charge port body and the cartridge may have complementary interlocking features configured to maintain engagement of the cartridge with the channel.

The cartridge body may be defined by an outer perimeter. The cartridge body may define a projection arranged on at least a portion of the outer perimeter. In such an embodiment, the projection may be configured to slidingly engage the channel.

The light element may form at least part of the projection.

The first side of the charge port body may include a lip configured to overlap at least part of the projection after the cartridge has engaged and has seated in the channel.

The light element may be configured to electrically connect to the electrical system of the EV and receive electrical current therefrom after the cartridge has engaged and has seated in the channel.

The light element may surround the access opening.

Alternatively, the access opening may be defined by an inner perimeter, and the light element may cover a portion of the inner perimeter of the access opening.

The light element may include a translucent cover and at least one light emitting diode (LED) and a light pipe in connection with the at least one LED. In such an embodiment, each of the at least one LED and light pipe may be housed within the cover.

The charge port module may include multiple LEDs, each projecting a different color light.

An electric vehicle including an EV body, a traction motor configured to generate EV propulsion torque, an EV electrical system including a rechargeable battery configured to generate electrical current for powering the traction motor, and the charge port module as described above is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
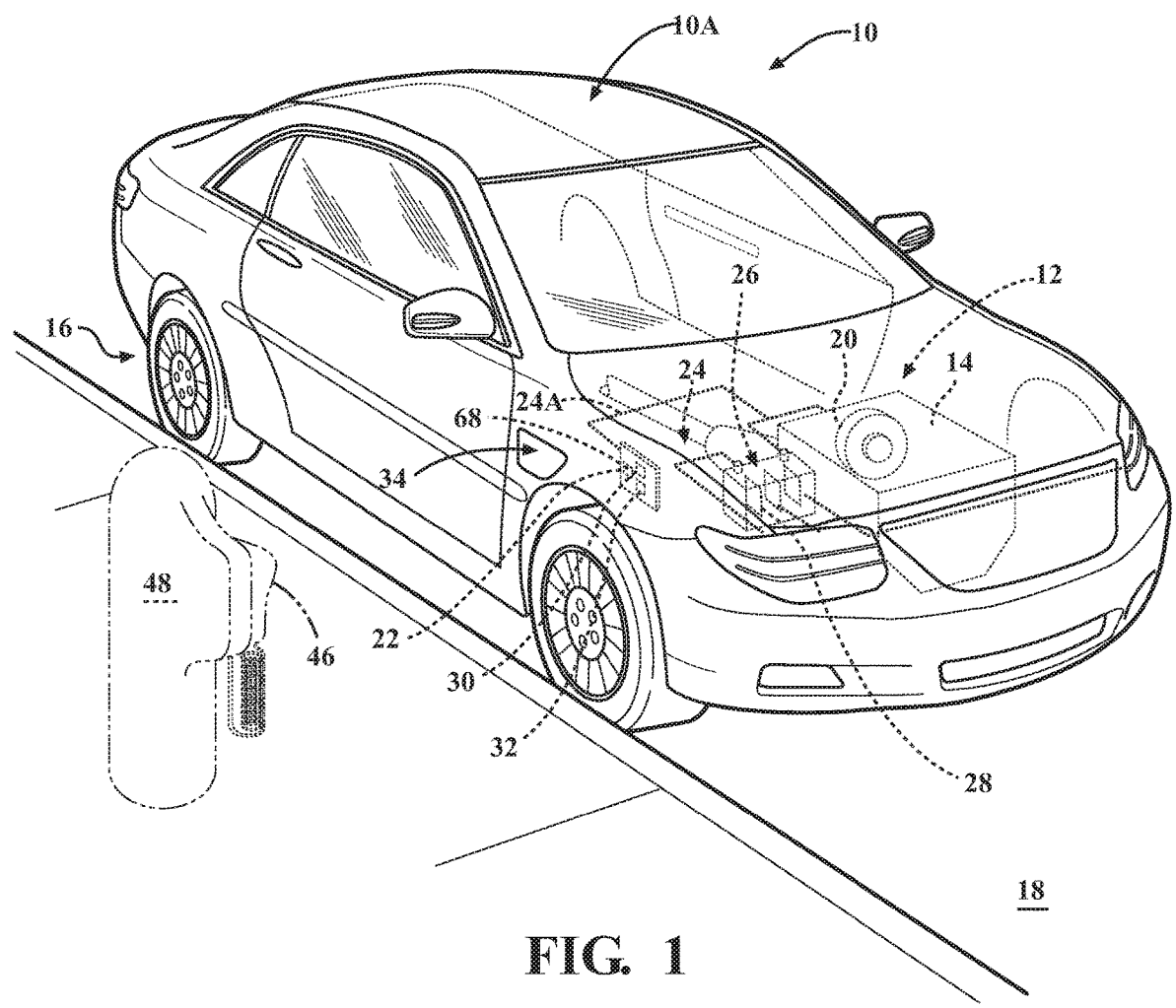
FIG. 1 is a schematic perspective view of an electric motor vehicle employing a charge port module, according to the disclosure.

Referring to FIG. 1, an electric vehicle (EV) 10 having an EV body 10A is depicted. The vehicle 10 may include, but not be limited to, a commercial vehicle, industrial vehicle, passenger vehicle, aircraft, watercraft, train or the like. It is also contemplated that the EV 10 may be a mobile platform, such as an airplane, all-terrain vehicle (ATV), boat, personal movement apparatus, robot and the like to accomplish the purposes of this disclosure. As shown, the EV 10 includes a powertrain 12. The powertrain 12 includes a power-source 14 configured to generate a power-source torque T (shown in FIG. 1) for propulsion of the EV 10 via driven wheels 16 relative to a road surface 18. The power-source 14 is depicted as an electric motor-generator or traction motor. As shown in FIG. 1, the powertrain 12 may also include an additional power-source 20, such as an internal combustion engine. The power-sources 14 and 20 may act in concert to power the EV 10.

Figure 2:
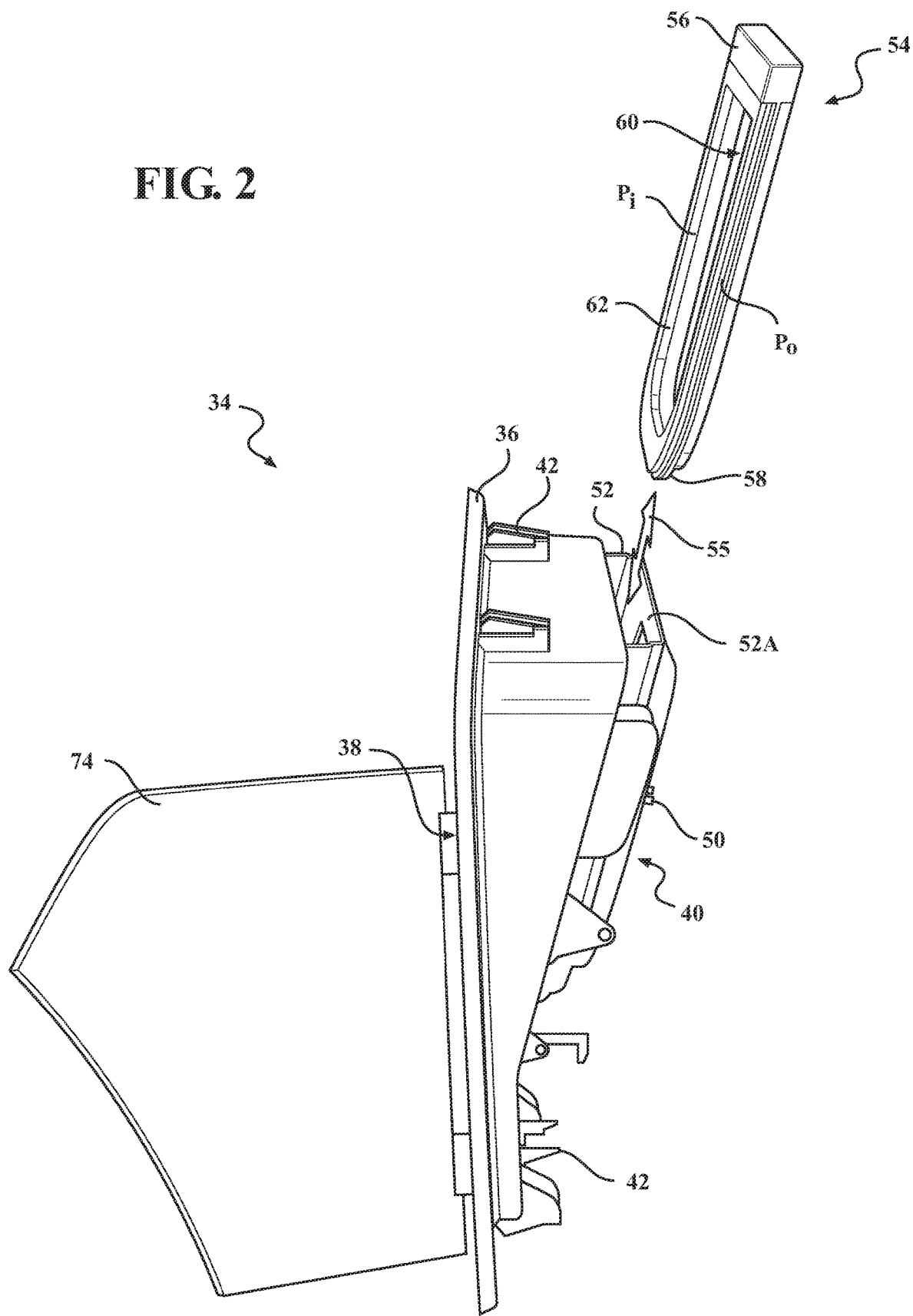
FIG. 2 is a schematic exploded perspective side view of the charge port module shown in FIG. 1, specifically depicting an illumination cartridge, according to the disclosure.

As shown, the EV 10 additionally includes a programmable electronic controller 22 and an EV electrical system 24. The electrical system 24 is connected to the power-sources 14 and 20, the electronic controller 22, as well as other vehicle systems, via a high-voltage BUS 24A. As shown in FIG. 2, the electrical system 24 includes a battery module 26 having one or more rechargeable energy storage cells or batteries 28. The battery module 26 is configured to generate electrical current for powering the traction motor 14 and supply electrical energy to the power-source 20. The electronic controller 22 may be programmed to control the powertrain 12 and the electrical system 24 to generate a predetermined amount of power-source torque T, and various other vehicle systems, such as lighting, infotainment, and heating ventilation and air conditioning (HVAC).

Specifically, the electronic controller 22 may be configured as a vehicle body controller or a central processing unit (CPU) programmed to regulate various systems and functions of the vehicle 10. To such an end, the electronic controller 22 includes a processor and tangible, non-transitory memory, for example with instructions for operation of the powertrain 12 and the electrical system 24 programmed therein. The memory may be an appropriate recordable medium that participates in providing computer-readable data or process instructions. Such a recordable medium may take many forms, including but not limited to non-volatile media and volatile media. Non-volatile media for the electronic controller 22 may include, for example, optical or magnetic disks and other persistent memory. Volatile media may include, for example, dynamic random access memory (DRAM), which may constitute a main memory.

Operating instructions may be transmitted by one or more transmission medium, including coaxial cables, copper wire and fiber optics, including the wires that comprise a system bus coupled to a processor of a computer, or via a wireless connection. Memory of the electronic controller 22 may also include a flexible disk, hard disk, magnetic tape, another magnetic medium, a CD-ROM, DVD, another optical medium, etc. The electronic controller 22 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the electronic controller 22 or accessible thereby may be stored in the memory and automatically executed to provide the required functionality of the powertrain 12 and the electrical system 24.

The electronic controller 22 may be specifically configured, i.e., programmed, to detect a request 30 for charging the battery module 26. The request 30 for charging the battery(s) 28 may be the result of detection of the battery module state of charge (SOC) having dropped below a predetermined SOC. The electronic controller 22 would then command a specific rate of charge 32 of the battery(s) 28 by setting a value of charge current I flowing into the battery module 26 in response to the detected request 30. The EV 10 additionally includes a charge port module 34. As shown in FIG. 2, the charge port module 34 includes a charge port body 36 having a first side 38 and a second side 40. The charge port module 34 also includes an interface 42 (shown in FIGS. 2 and 4) arranged on the second side 40 for mounting to the EV body 10A, such as clips for fixed retention of the charge port module 34 to a fender panel of the EV body. The charge port module 34 additionally includes a port or receptacle 44 (shown in FIG. 3) fixed to the first side 38 of the charge port body 36. The receptacle 44 is configured to accept a charging plug 46 (shown in FIG. 1) connected to an external source 48 of electricity, such as a charging station, and thereby accept the charge current I for recharging the battery(s) 28 of the EV 10.

As may be seen in FIG. 2, the charge port module 34 also includes an electrical connector 50 fixed to the second side 40 of the charge port body 36. The electrical connector 50 is in electrical communication with the receptacle 44, and configured to engage the EV electrical system 24. The charge port module 34 additionally includes a locating track or a channel 52 defined by the first side 38 of the charge port body 36. The channel 52 defines a pocket 52A. As shown, the charge port module 34 further includes a cartridge 54 configured to slidingly engage, i.e., connect with and slide with respect to, the channel 52. The sliding engagement of the cartridge 54 relative to the charge port body 36 is specifically indicated in FIG. 2 by a double arrow 55. The cartridge 54 includes a cartridge body 56 defined by an outer perimeter $P_o$.

Figure 5:
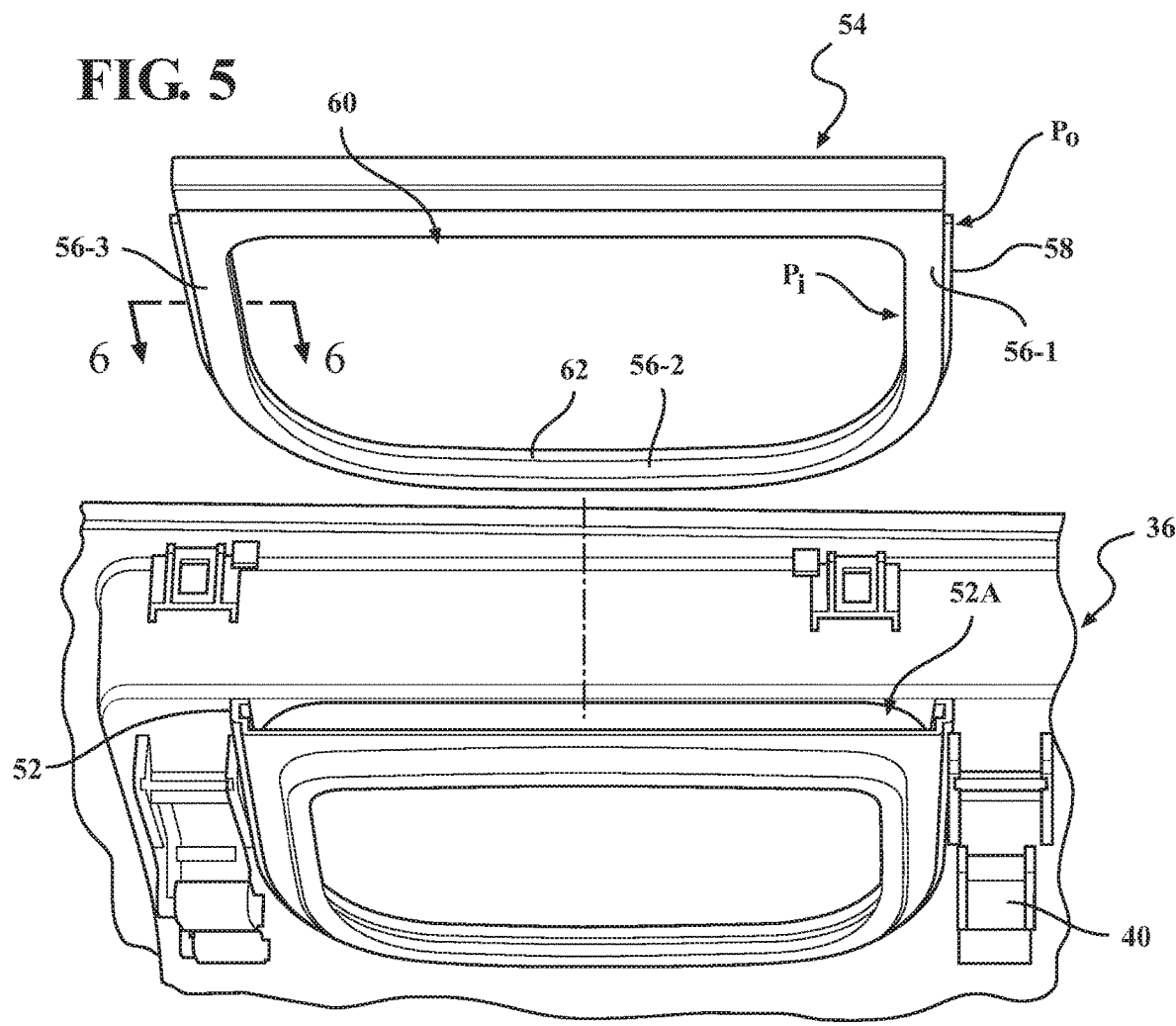
FIG. 5 is a schematic exploded perspective back view of the charge port module shown in FIGS. 1 and 2, according to the disclosure.

With continued reference to FIG. 2, the cartridge body 56 may define a projection 58. The projection 58 may be arranged on at least a portion of the outer perimeter $P_o$ of the cartridge body 56. The projection 58 may be positioned on the outer perimeter $P_o$, on at least two sides of the cartridge body 56. In a particular embodiment, the projection 58 may be positioned on three sides of the cartridge body 56, for example on sides 56-1, 56-2, and 56-3, as depicted in FIG. 5. The projection 58 is specifically configured to slidingly engage the channel 52 for assembling the cartridge 54 with the charge port body 36. In other words, the projection 58 is designed and constructed to fit into and slide along the channel 52 until the cartridge 54 fully seats into a pocket 52A created by the channel within the charge port body 36.

The first side 38 of the charge port body 36 may include a lip 38A configured to overlap at least part of the projection 58 after the cartridge 54 has engaged and has seated in the channel 52. The lip 38A is thereby shaped to cover a seam 39 between the first side 38 of the charge port body 36 and the cartridge body 56 when the cartridge 54 is seated in the channel 52. The cartridge body 56 also defines an access opening 60 (shown in FIG. 5) having an inner perimeter $P_i$. The access opening 60 is configured to facilitate access of the charging plug 46 to the receptacle 44 after the cartridge has engaged and became completely seated in the channel 52. The cartridge 54 also includes a light element 62 arranged proximate the access opening 60.

Figure 3:
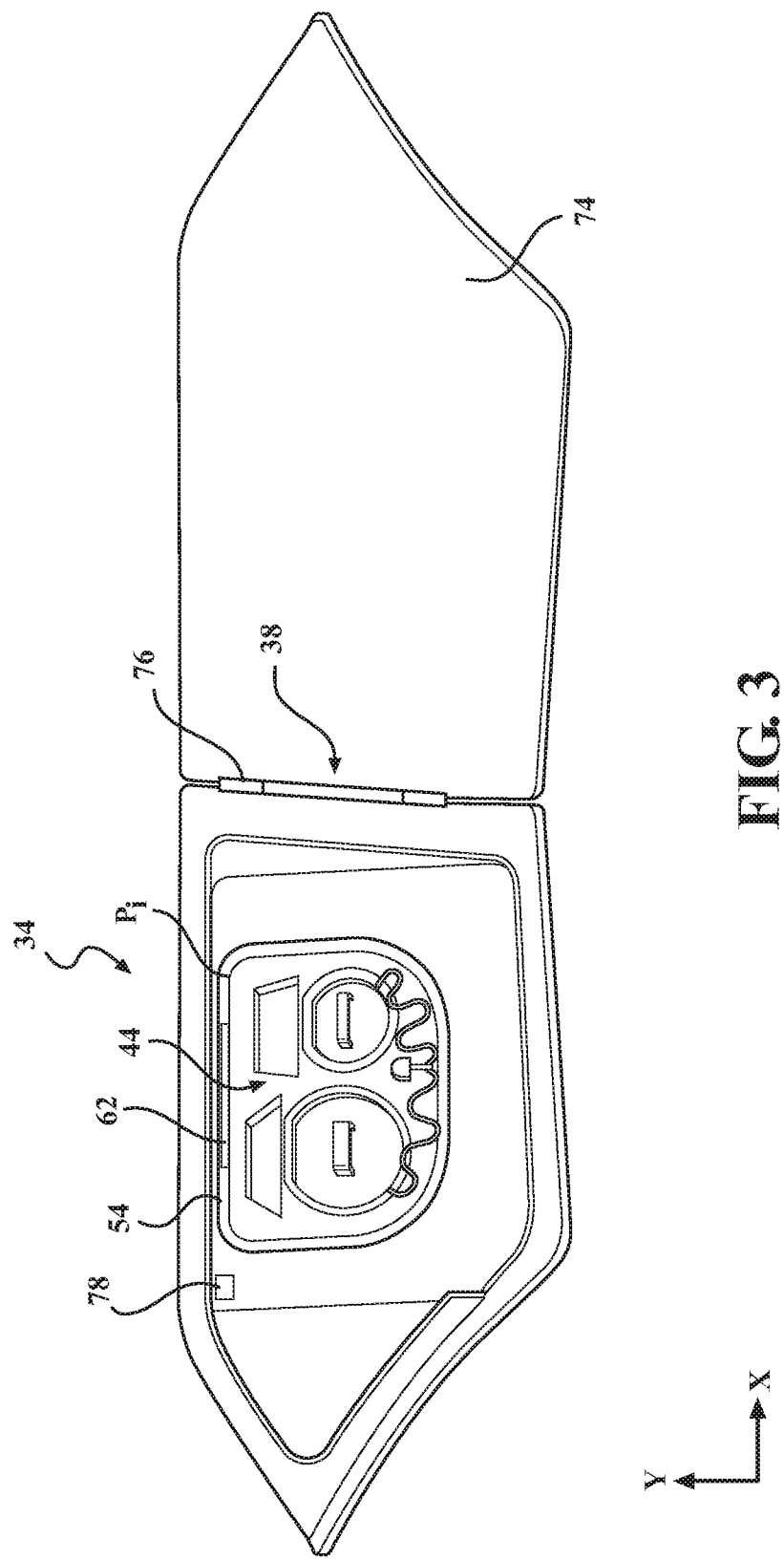
FIG. 3 is a schematic front view of the charge port module shown in FIGS. 1 and 2, specifically depicting an embodiment of the illumination cartridge and a horizontally hinged charge port door, according to the disclosure.
Figure 4:
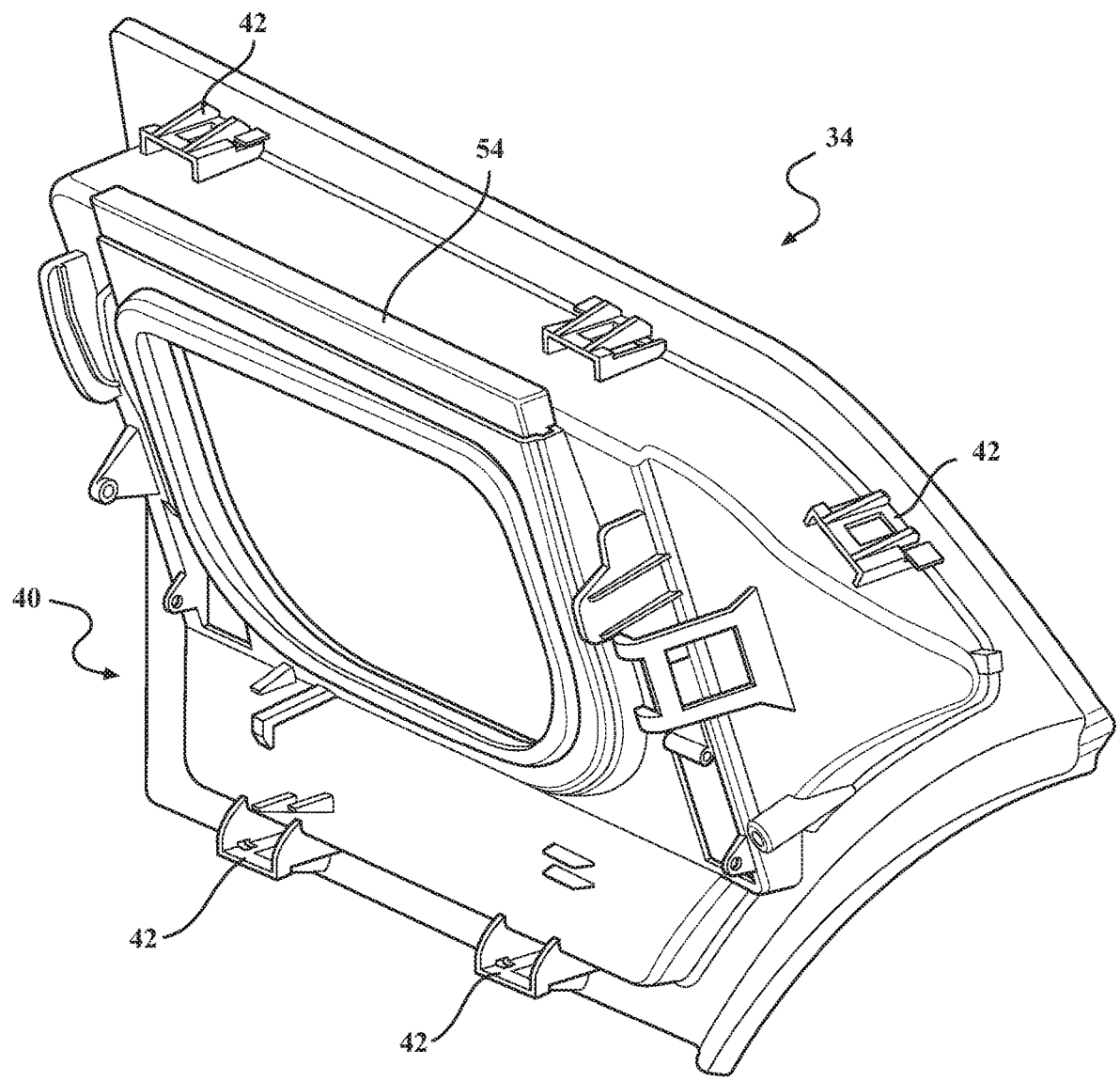
FIG. 4 is a schematic perspective back view of the charge port module shown in FIGS. 1 and 2, according to the disclosure.
Figure 6:
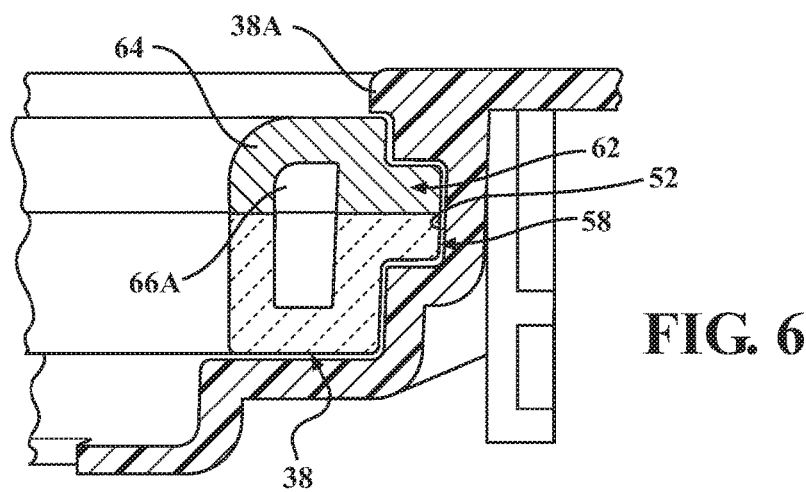
FIG. 6 is a schematic partial cross-sectional view of the charge port module shown in FIG. 5, according to the disclosure.
Figure 7:
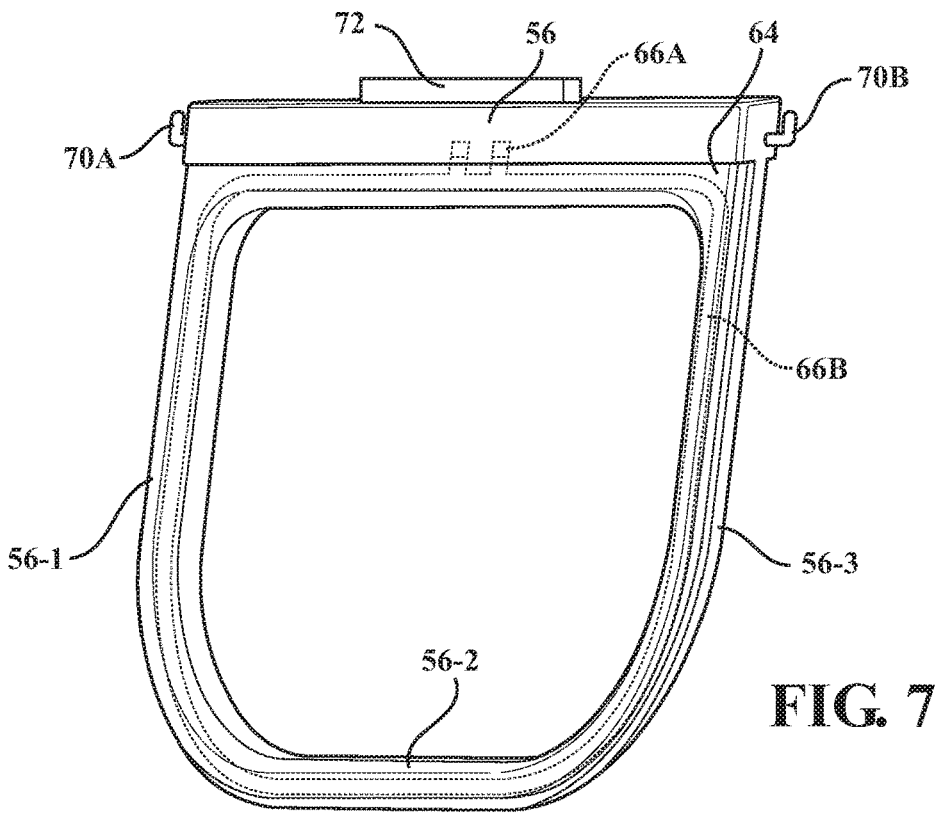
FIG. 7 is a schematic perspective view of another embodiment of the illumination cartridge shown in FIG. 2, according to the disclosure.
Figure 8:
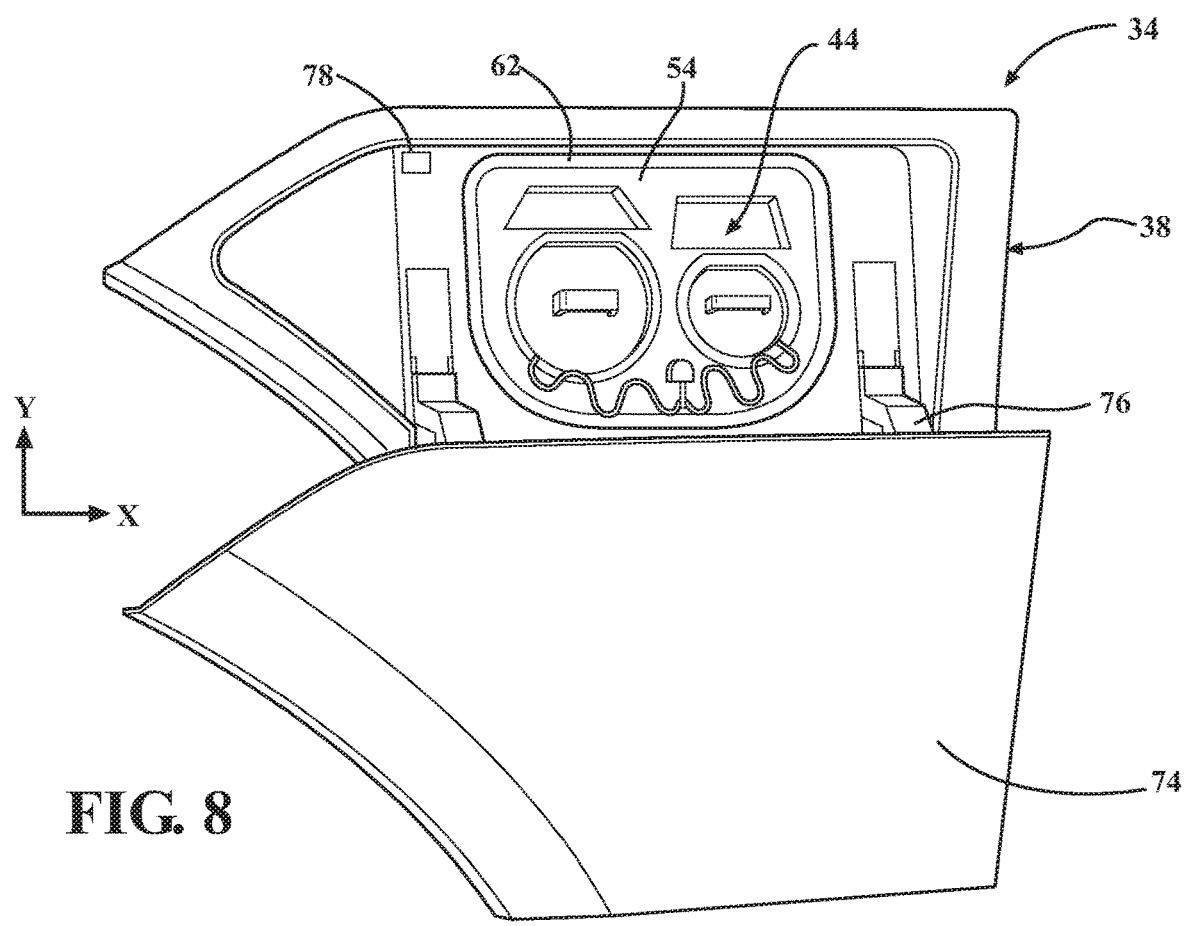
FIG. 8 is a schematic front view of the charge port module shown in FIGS. 1 and 2, specifically depicting a vertically hinged charge port door, according to the disclosure.

As shown, the light element 62 is arranged on the cartridge body 56 and configured to illuminate, i.e., project light onto, the receptacle 44. The light element 62 may form at least part of the projection 58. As seen in FIG. 6, showing a cross-sectional view 6-6 depicted in FIG. 5, the light element 62 extends into the projection 58. The light element 62 may be a substantially continuous member surrounding the access opening 60, as shown in FIGS. 2, 7, and 8. Alternatively, as shown in FIG. 3, the light element 62 may cover a specific portion of the inner perimeter $P_i$, of the access opening 60. Specifically, the light element 62 may be a compact member integral to the cartridge body 56 and positioned to aim a beam of light directly at the receptacle 44 (shown in FIG. 3) when the cartridge 54 is seated in the charge port body 36.

The light element 62 may be configured to connect to the electrical system 24 of the EV 10 and receive the electrical current I therefrom after the cartridge 54 has engaged and has seated in the channel 52. The light element 62 may include a translucent cover 64, and a combination of fiberoptic elements, such as at least one light emitting diode (LED) 66A and a light pipe 66B in connection therewith (shown in FIG. 7). As shown, each LED 66A and light pipe 66B may be housed within the cover 64. When multiple LEDs 66A are used in the light element 62, each of the LED 66A may selectively project a different color light into the light pipe 66B. Selective activation of specific LEDs 66A may be commanded by the vehicle operator via an in-vehicle user interface (not shown) or be automatically regulated by the electronic controller 22. In other words, the charge port module 34 having multiple LEDs 66A may enable individually selected or "customizeable" illumination.

For example, the electronic controller 22 may be programmed to activate a particular color LED 66A in correlation with a particular vehicle, such as the vehicle 10, the charge port module 34 is installed into. Accordingly, different vehicles or vehicle lines may be configured to accept the charge port module 34 with multiple LEDs 66A, with each vehicle employing different color illumination of its respective receptacle 44. The electronic controller 22 may be also programmed to activate a particular light display via the light element 62, such as blinking patterns, repeating patterns of illumination having varying intensity or colors. Such distinct patterns may, for example, be used during charging of the battery module 26 to alert the vehicle operator of an achieved SOC. An alert 68 may be programmed into the electronic controller 22 either by the vehicle manufacturer or by the vehicle user, and, for example, be indicative of a full charge, a 50% charge, or other SOC.

As shown in FIG. 2, the charge port body 36 and the cartridge 54 may have complementary corresponding interlocking features 70A and 70B (shown in FIG. 2). The interlocking features 70A, 70B are configured to fix and retain position of the cartridge 54 relative to the charge port body 36, i.e., maintain engagement of the cartridge within the channel 52. The interlocking feature 70A may, for example, be configured as receiver(s) that are part of the charge port body 36 (shown in FIG. 2), while the interlocking feature 70B may be configured as tab(s) that are part of the cartridge body 56 (shown in FIGS. 2 and 7). Alternatively, specific arrangement of the interlocking features 70A, 70B may be reversed, such that, for example, the tab(s) are part of the charge port body 36 and the receiver(s) are part of the cartridge 54 (not shown). The interlocking features 70A, 70B may permit removal and replacement of the cartridge 54 as needed. The cartridge body 56 may include a handle portion 72 specifically configured to permit the cartridge to be grasped by the vehicle user or a technician for removal from the charge port module 34.

As shown in FIGS. 3 and 8, the charge port module 34 also includes a charging door 74. The charging port door 74 may be connected to the charge port body 36 via a hinge 76 and configured to either swing substantially in a horizontal plane X (shown in FIG. 3), i.e., to one side of the receptacle 44, or drop down below the receptacle substantially in a vertical plane Y (shown in FIG. 8). The charging port door 74 is configured to selectively cover the receptacle 44 and provide access thereto. The charge port module 34 may have a mechanical, electromechanical, or electromagnetic latching mechanism 78 configured to selectively maintain closure of the charging port door 74 and be unlocked when access to the receptacle 44 is required. The electronic controller 22 may be programmed to activate the light element 62 in response to the door 74 being opened, such as upon triggering of the locking mechanism 78, to timely commence illumination of the receptacle 44.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A charge port module for an electric vehicle (EV), the module comprising:
   a charge port body having a first side, an opposite second side, and an interface for mounting to a body of the EV;
   a receptacle fixed to the first side of the charge port body and configured to accept a charging plug;
   an electrical connector fixed to the second side of the charge port body, in electrical communication with the receptacle, and configured to engage an electrical system including a battery of the EV;
   a channel defined by the first side of the charge port body; and
   a cartridge configured to slidingly engage the channel, the cartridge including:
      a cartridge body defining an access opening configured to facilitate access of the charging plug to the receptacle after the cartridge has engaged and has seated in the channel; and
      a light element arranged on the cartridge body and configured to illuminate the receptacle.

2. The charge port module of claim 1, wherein the charge port body and the cartridge have complementary interlocking features configured to maintain engagement of the cartridge with the channel.

3. The charge port module of claim 1, wherein the cartridge body is defined by an outer perimeter, wherein the cartridge body defines a projection arranged on at least a portion of the outer perimeter, and wherein the projection is configured to slidingly engage the channel.

4. The charge port module of claim 3, wherein the light element forms at least part of the projection.

5. The charge port module of claim 3, wherein the first side of the charge port body includes a lip configured to overlap at least part of the projection after the cartridge has engaged and has seated in the channel.

6. The charge port module of claim 1, wherein the light element is configured to electrically connect to the electrical system of the EV and receive electrical current therefrom after the cartridge has engaged and has seated in the channel.

7. The charge port module of claim 1, wherein the light element surrounds the access opening.

8. The charge port module of claim 1, wherein the access opening is defined by an inner perimeter, and wherein the light element covers a portion of the inner perimeter of the access opening.

9. The charge port module of claim 1, wherein the light element includes a translucent cover, and at least one light emitting diode (LED) and a light pipe in connection with the at least one LED, and wherein each of the at least one LED and light pipe is housed within the cover.

10. The charge port module of claim 9, wherein the at least one LED includes multiple LEDs, each projecting a different color light.

11. An electric vehicle (EV) comprising:
an EV body;
a traction motor configured to generate EV propulsion torque;
an EV electrical system including a rechargeable battery configured to generate electrical current for powering the traction motor; and
a charge port module having:
a charge port body having a first side, a second side, and an interface for mounting to the EV body;
a receptacle fixed to the first side of the charge port body and configured to accept a charging plug;
an electrical connector fixed to the second side of the charge port body, in electrical communication with the receptacle, and configured to engage the EV electrical system; and
a channel defined by the first side of the charge port body; and
a cartridge configured to slidingly engage the channel, the cartridge including:
a cartridge body defining an access opening configured to facilitate access of the charging plug to the receptacle after the cartridge has engaged and has seated in the channel; and
a light element arranged on the cartridge body and configured to illuminate the receptacle.

12. The electric vehicle of claim 11, wherein the charge port body and the cartridge have complementary interlocking features configured to maintain engagement of the cartridge with the channel.

13. The electric vehicle of claim 11, wherein the cartridge body is defined by an outer perimeter, wherein the cartridge body defines a projection arranged on at least a portion of the outer perimeter, and wherein the projection is configured to slidingly engage the channel.

14. The electric vehicle of claim 13, wherein the light element forms at least part of the projection.

15. The electric vehicle of claim 13, wherein the first side of the charge port body includes a lip configured to overlap at least part of the projection after the cartridge has engaged and has seated in the channel.

16. The electric vehicle of claim 11, wherein the light element is configured to electrically connect to the EV electrical system and receive electrical current therefrom after the cartridge has engaged and has seated in the channel.

17. The electric vehicle of claim 11, wherein the light element surrounds the access opening.

18. The electric vehicle of claim 11, wherein the access opening is defined by an inner perimeter, and wherein the light element covers a portion of the inner perimeter of the access opening.

19. The electric vehicle of claim 11, wherein the light element includes a translucent cover and at least one light emitting diode (LED) and a light pipe in connection with the at least one LED, and wherein each of the at least one LED and light pipe is housed within the cover.

20. The electric vehicle of claim 19, wherein the at least one LED includes multiple LEDs, each projecting a different color light.

* * * * *